Feb. 22, 1944.  M. TAMA ET AL  2,342,617
SUBMERGED RESISTOR-TYPE INDUCTION FURNACE FOR MELTING METALS
Filed July 1, 1943  2 Sheets-Sheet 1
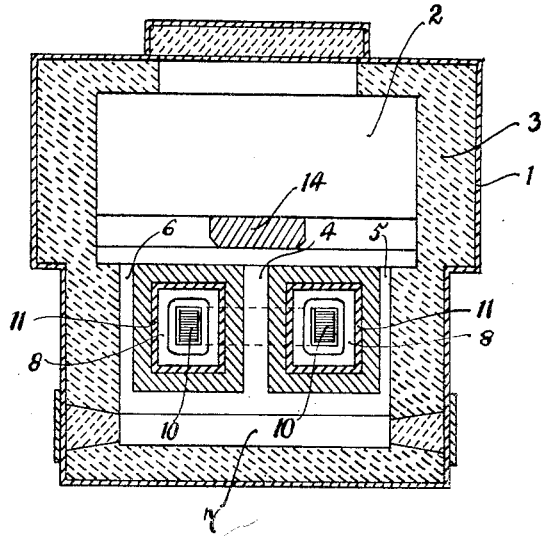
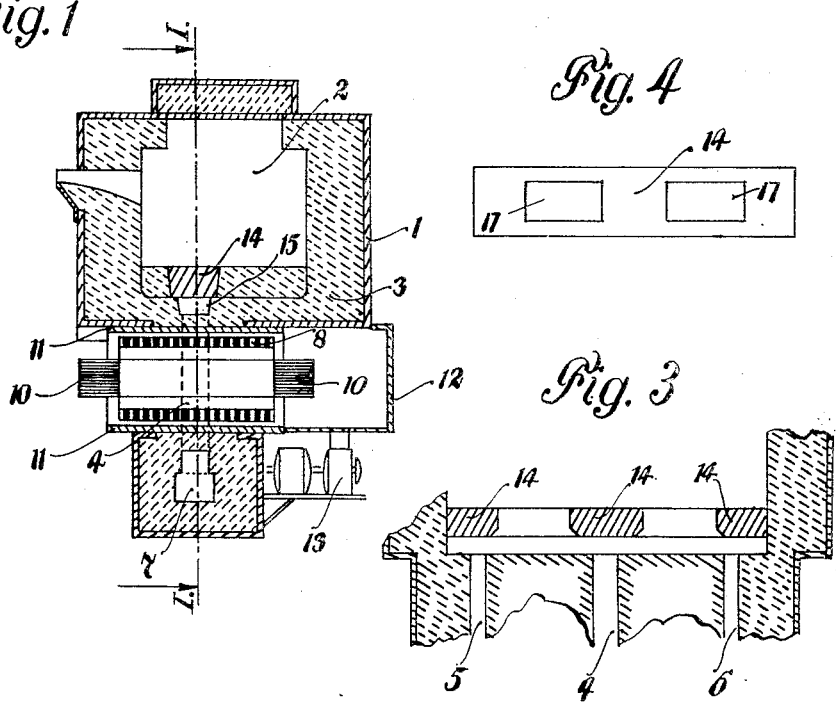
INVENTORS
MANUEL TAMA
MARIO TAMA
BY
ATTORNEY.

Feb. 22, 1944. M. TAMA ET AL 2,342,617
SUBMERGED RESISTOR-TYPE INDUCTION FURNACE FOR MELTING METALS
Filed July 1, 1943 2 Sheets-Sheet 2
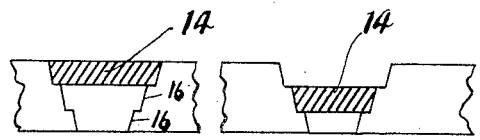
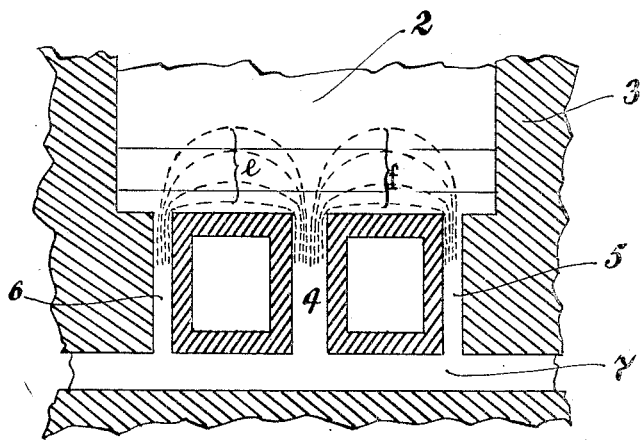
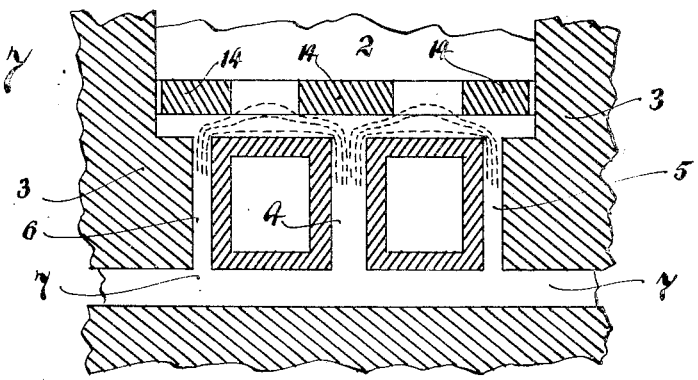
INVENTORS
MANUEL TAMA
MARIO TAMA
BY
D. Freeman
ATTORNEY.

Patented Feb. 22, 1944

2,342,617

UNITED STATES PATENT OFFICE

2,342,617

SUBMERGED RESISTOR-TYPE INDUCTION FURNACE FOR MELTING METALS

Manuel Tama and Mario Tama, Morrisville, Pa., assignors to Ajax Engineering Corporation, Trenton, N. J.

Application July 1, 1943, Serial No. 493,156

6 Claims. (Cl. 13—29)

This invention relates to a submerged resistor-type induction furnace for melting metals and particularly light metals.

In furnaces of this kind the violent movement of the melt occurs by virtue of electro-magnetic forces created in the heating channels which form the secondary loop of the furnace. This vigorous motion of the melt occurs chiefly at the points where the channels open into the hearth.

The circulation resulting from the movement of the melt is, of course, one of the important purposes in an induction furnace and therefore beneficial to obtain a uniform composition of the metallic charge.

If, however, light metals such as aluminum, magnesium and their alloys, are to be melted in an induction furnace, great disadvantages arise from excessive stirring and upward movement of the molten metal from the mouth of the melting channels, inasmuch as excessive oxidation and scorification of the light metals is caused.

Furthermore, in furnaces of this type, oxides, nitrides and other impurities contained in the melt are apt to penetrate into the melting channels and to be deposited on the walls thereof. The result is that the effective cross-section of the channels is reduced, and that consequently the power absorbed by the furnace is gradually diminished, until finally the operation of the furnace is interrupted by the clogging of the channels.

In order to adapt submerged resistor-type furnaces for continuous melting of light metals, two methods have been proposed in the past: according to the one method, the secondary channel is made of a comparatively large cross-section and the furnace is emptied completely every few hours so that the melting channel can be cleaned—usually by means of special tools or flexible chains.

In the other method, the secondary channel is made accessible from the outside, at its lower part, where most of its impurities such as slag, etc., usually accumulate. A cleanout door or opening is provided at the bottom of the melting channel, which can be sealed with a brick during melting, but which can be uncovered to allow removal of the accumulated slag.

The furnace of the present invention is an improvement over furnaces utilizing both of the methods described.

It, therefore, is an important object of this invention to control in a submerged resistor-type induction furnace particularly intended for melting light metals, the excessive movement of the melt produced by electro-magnetic forces.

It is another object of the invention to dampen and to reduce vigorous stirring of the melt occurring in the vicinity of the openings of the melting channels into the hearth.

It is another object of the invention to provide a submerged resistor-type induction furnace with means to prevent excessive motion of the metal to develop at the bath surface.

Another purpose of the invention is to increase the over-all resistance of the melting channels, thus improving the ratio between resistance and reactance, and at the same time increasing the power factor.

Another object of the invention is to avoid substantial changes of cross-section in the path of the current flowing through the heating channels.

It is also an important object of the invention to provide a submerged resistor type induction furnace with means which prevent non-metallic components of the melt from easy penetration into the melting channels, thus allowing the furnace to be operated at longer continuous periods and without frequent interruptions for slag removals.

With these and other objects in view, which will become apparent as this specification proceeds, the invention is described and illustrated in its application to a furnace which is claimed in the co-pending U. S. patent application Serial No. 462,866 filed by Manuel Tama.

However, we do not wish to limit the invention to furnaces of this type, as the same may be adapted to other induction furnaces.

In the drawings

Fig. 1 is a sectional elevation view of the furnace

Fig. 2 is a sectional elevation view taken on line I to I of Fig. 1

Figs. 3, 4 and 5 are fragmentary sectional elevations and a top view of additional modifications of the invention Figs. 6 and 7 are sectional elevations drawn through the same plane as Fig. 2, showing in detail the flow of current between the channels and the hearth in furnaces of the conventional type (Fig. 6) and of the type according to the present invention (Fig. 7).

In general construction the furnace of the present invention is similar to submerged resistor-type furnaces of customary design. A lengthy description of the principle of operation is therefore believed to be unnecessary. The principal parts are a housing 1, comprising a hearth 2, and a melting section. The hearth is adapted to hold the bulk of a charge of metal to be melted and is lined with refractory material 3. In the particular design chosen for illustrating this invention a furnace provided with two loops is described; therefore, three vertical legs 4, 5 and 6, are provided, which connect the bottom section of the melting hearth with the horizontal portion 7.

The primary comprises, in this particular case, two coils of insulated copper wire, which are connected in operation to a supply source of standard frequency alternating current, not shown. In the drawing, these coils are denominated by the numeral 9. An iron core 10, threads the primary winding and is closed in itself on both sides of the furnace. The transformer primary assembly is insulated from the refractory of the melting loop by an asbestos cement sleeve 11 and is contained in a housing 12, to which a cooling current of air may be passed by a blower 13.

The foregoing description would apply to almost any submerged resistor-type induction furnace.

The novel features of the furnace comprise the design and arrangement of the melting channels. The difference between conventional furnaces and the furnaces according to the present invention is more clearly shown in Figures 6 and 7.

It will be noted from Fig. 6 that in the conventional type of submerged resistor induction furnace, the secondary loop has a restricted cross-section only in its vertical parts, and the line below the level of the opening of the channels into hearth 2. In the drawings, the path of the current flow is shown in dotted lines. These lines show that a large current density is only present in the submerged parts of the loop while the current passing through the hearth has a much larger cross-section, $e$ and $f$, so that the current density in these points is much smaller than in the melting channels proper. Applicants' experience indicates that violent motion, due to electro-magnetic forces, occurs in places where there is a change in current density or field density in the channel. It is believed that the strong movement observed in high-powered induction furnaces for light metals is mainly due to the sudden change in cross-section occurring where the melting channels open into the hearth, as illustrated in Figure 6, showing the lines of current density.

Figure 7 shows the design of the melting channels according to the present invention.

In contradistinction to furnaces, as shown in Fig. 6, it will be noted that in the furnaces, according to the present invention, the secondary loop formed by melting channels has a restricted cross-section along its full length or perimeter. In other words, also that part of the secondary loop which is situated directly above the level of the channel opening or openings into the hearth, is designed to form a restricted current cross-section, increasing hereby the current density in this part of the secondary loop. The current density as shown in Fig. 7 by dotted lines, will therefore be approximately the same over the entire length of the secondary loop.

The means utilized by the applicant for obtaining these purposes comprise the design and the arrangement of baffle plates located in the bottom section of the hearth above the channel mouth in such a manner as to render the furnace commercially practical, particularly for melting light metals and alloys, or for carrying on other metallurgical processes.

The means used for restricting the cross section of the upper part of the secondary loop are baffle plates, as shown in Figures 1 and 2 by numeral 14. They may consist of a flat body of a suitable refractory material; they are loosely located in the bottom section of the hearth at a certain distance above the mouth of the melting channels, which bottom section may be provided for this purpose with projections or steps 15.

In order to insure a reliable seat of the baffles and to prevent undesired uplifting of the same by the metal currents emerging from the mouth of the melting channels the refractory material used for the baffles should have a higher specific weight than the molten metal. Zirconiumsilicate has been found to be a material which satisfactorily answers the purposes of the invention.

As previously explained the electro-magnetic pressure, particularly caused by the pinch effect at the opening of the melting channels, causes a violent upward movement of the metal contained in the hearth in a vertical direction. The baffle plate 14 dampens and deflects the metal current without otherwise impairing the operation of the furnace. The clearance left below the baffle plate or the distance between the baffle and the channel mouth may easily be regulated, for instance by the provision of a plurality of steps 16, Fig. 5, and corresponding baffle plates 14, so as to obtain a satisfactory amount of movement and of heat dissipation. But it must be kept in mind that the baffle plates 14 are not just a mechanical means of deflecting a violent current of metal, but their main aim is to control the forces which cause this intense movement of the molten metal. They do not only deflect, but actually reduce the speed of the metal to a small fraction of what it used to be, as explained previously in connection with Figures 6 and 7.

In the modification of the invention shown in Figures 1 and 2 the baffle plate 14, is located above the center channel whereas, in Figure 3, three baffle plates are shown, which are seated above all three melting channels.

In accordance with the embodiment of the invention shown in Figure 4, a baffle insert is provided consisting of a flat refractory body, 14, having openings 17 for the metal to stream upward after the current intensity has been dampened by the insert and the vigorous upward current has been laterally deflected.

As a preferred embodiment of the invention, the baffles are loosely located in the bottom section of the hearth with no special means firmly holding the same; therefore, it will be easy to remove the same in case the channels are to be cleaned.

Various changes may be made of the constructional details disclosed in the foregoing specification without departing from the spirit of the invention or sacrificing advantages thereof.

We claim:

1. A submerged resistor-type induction furnace, particularly for melting light metals, comprising within a housing a hearth, a transformer assembly, a secondary loop including a plurality of melting channels opening into the hearth, means of an electrically non-conducting nature located in the bottom section of the said hearth above the channel openings to increase the current density in that portion of the said secondary loop which is located directly above the level of the channel opening into the hearth.

2. A submerged resistor-type induction furnace, particularly for melting light metals, comprising within a refractory housing an upper hearth, a transformer assembly and a secondary loop underneath the said hearth, said loop including a plurality of melting channels opening into the hearth, and at least one baffle plate of a refractory material located in the bottom section of the said hearth above the channel openings.

3. A submerged resistor-type induction furnace, particularly for melting light metals, comprising within a refractory housing an upper hearth, a transformer assembly and a secondary loop underneath the said hearth, said loop including a plurality of channels opening into the hearth, at least one baffle plate of a refractory material having a specific weight heavier than that of the molten metal loosely located in the bottom section of the said hearth above the channel openings.

4. A submerged resistor-type induction furnace, particularly for melting light metals, comprising within a refractory housing an upper hearth, a stepped bottom section in the said hearth, a transformer assembly and a secondary loop underneath the said hearth, said loop including a plurality of melting channels opening into the hearth, at least one baffle plate of a refractory material loosely located on the said bottom steps above the channel openings.

5. A submerged resistor type induction furnace particularly for melting light metals, comprising within a housing a hearth, a collecting chamber underneath the said hearth, a transformer assembly, a secondary loop including a plurality of melting channels opening into the hearth and in the collecting chamber, means of an electrically nonconducting nature located in the bottom section of the said hearth above the channel openings to maintain a substantially uniform current density throughout the said secondary loop.

6. A submerged resistor type induction furnace particularly for melting light metals, comprising within a housing a hearth, a collecting chamber underneath the said hearth, a transformer assembly, a secondary loop including a plurality of melting channels opening into the hearth and in the collecting chamber, means of an electrically nonconducting nature located in the bottom section of the said hearth above the channel openings to dampen the upward stream of the metal and to laterally deflect the same for transition into the upper part of the hearth.

MANUEL TAMA.
MARIO TAMA.